United States Patent [19]
Hrovat et al.

[11] 3,975,471
[45] Aug. 17, 1976

[54] PROCESS FOR THE PRODUCTION OF FUEL COMBINED ARTICLES FOR ADDITION IN BLOCK SHAPED HIGH TEMPERATURE FUEL ELEMENTS

[75] Inventors: Milan Hrovat, Rodenbach; Lothar Rachor, Kleinauheim, both of Germany

[73] Assignee: Hobeg Hochtemperaturreaktor-Brennelement GmbH, Germany

[22] Filed: July 17, 1974

[21] Appl. No.: 489,436

[30] Foreign Application Priority Data
July 27, 1973 Germany............................ 2338155

[52] U.S. Cl.............................. 264/.5; 252/301.15
[51] Int. Cl.² ......................................... G21C 21/00
[58] Field of Search................... 264/.5; 252/301.15

[56] References Cited
UNITED STATES PATENTS

| | | | |
|---|---|---|---|
| 3,214,499 | 10/1965 | Burnham, Jr. et al. | 264/.5 |
| 3,342,910 | 9/1967 | Ishihara et al. | 264/.5 |
| 3,644,604 | 2/1972 | Hooker | 264/.5 |
| 3,845,178 | 10/1974 | Hrovat | 264/.5 |

FOREIGN PATENTS OR APPLICATIONS

| | | | |
|---|---|---|---|
| 1,249,156 | 4/1968 | United Kingdom | 264/.5 |

Primary Examiner—Samuel W. Engle
Assistant Examiner—Peter A. Nelson
Attorney, Agent, or Firm—Cushman, Darby & Cushman

[57] ABSTRACT

There is provided a process for the production of fuel compacts consisting of an isotropic, radiation resistant graphite matrix of good heat conductivity having embedded therein coated fuel and/or fertile particles for insertion into high temperature fuel elements by providing the coated fuel and/or fertile particles with an overcoat of molding mixture consisting of graphite powder and a thermoplastic resin binder. The particles after the overcoating are provided with hardener and lubricant only on the surface and subsequently are compressed in a die heated to a constant temperature of about 150°C., hardened and discharged therefrom as finished compacts.

10 Claims, No Drawings

PROCESS FOR THE PRODUCTION OF FUEL COMBINED ARTICLES FOR ADDITION IN BLOCK SHAPED HIGH TEMPERATURE FUEL ELEMENTS

The invention is directed to a process for the production of fuel compacts which consist of an isotropic radiation resistant graphite matrix of good heat conductivity with coated fuel and/or fertile (breeder) particles embedded therein, for insertion into a high temperature fuel element by providing the coated particles with an overcoat of molding mixture consisting of graphite powder and a thermoplastic binder.

An important form of block shaped fuel elements for high temperature nuclear reactors is prisms of electrographite, preferably hexagonal in cross-section, with numerous axial bores which serve in part to receive the fuel bodies and partially for conducting cooling gas. The fuel and fertile materials are added in the form of coated fuel spheres of about 0.5 to 1 mm size which are coated with pyrolytic carbon, i.e, they are coated particles. The fuel nucleus consists of a mixture of uranium-thorium dioxide or uranium-thorium dicarbide. The thorium and the isotope U 238 serve as fertile materials. As the fissile material today there is inserted exclusively the isotope U 235 which can be enriched up to 90% in the uranium-isotope mixture but U 233 or Pu 239 also can be used.

Coating of the fuel particles with carbon which generally is formed on the particles from gaseous hydrocarbons in a fluidized bed at temperatures between 1000° and 2000°C. has the function of retaining the radioactive fission products arising during the operation of the reactor in the interior of the individual fuel particles.

These particles are embedded in a good thermally conductive carbon matrix and form with this a dimensionally stable compact. Prerequisite for a good thermal conductivity is a carbon matrix with as high as possible a geometrical density and a good crystalline arrangement. The dimensional stability of the compact during the total residence time in the reactor besides assumes as high as possible good isotropy of the physical properties of this matrix.

According to a known process, the fuel particles are overcoated with the total necessary amount of molding mixture, consisting of graphite powder and thermoplastic binder resin and molded with heating of the compacts (Redding, U.S. Pat. No. 3,344,211).

Since the hardening process already begins during the plasticization, i.e., before a sufficient compression can occur, a relatively high molding pressure is necessary. At the partially necessary high volume loading of coated particles (over 40%) this often leads to injury of the coating of the fuel particles. Exposed fuel, however, causes an inadmissibly high loading of fission products in the cooling cycle of the reactor. In order to avoid the high molding pressure, it was attempted to plasticize the molding mixture at temperatures which do not lead to hardening, and subsequently to effect the hardening by increase in temperature (HROVAT German Offenlegungsschrift 2 154 622). A disadvantage of this is that the energy requirement for heating and cooling is relatively high. The necessarily existing heat capacity of the tools, the conduits and the heating or cooling agents limits the speed of change of the temperature and therewith the throughput. At the usable temperature levels below the limit of hardening the plasticization is incomplete and the introduction of heat into the material to be pressed is correspondingly slow.

For reduction of the molding pressure, it has further been proposed (Sturge, Great Britain Patent 1,286,286) to incorporate a mold release agent with the overcoating material prior to coating on the fuel particles. To substantially reduce friction, however, there must be added a relatively high portion of mold release agent. This high portion after the heat treatment leaves behind considerable porosity and considerably impairs the strength and heat conductivity of the compacts thus produced.

In order to attain high bonding of fuel and/or fertile particles without destruction of coated particles, moreover, there are known processes in which the intermediate space of the particle packing is filled with a flowable mass. (Goeddel, German Offenlegungsschrift 1764558.) This mass consists largely of thermoplastic binders to which a small portion of finely ground graphite powder is admixed since the mass cannot otherwise be pressed into the narrow hollow space. From this there results the disadvantage that the compacts before the carbonization is not dimensionally stable in the heated condition. Therefore, it can only be expelled from the mold after cooling and must be trimmed in the later heat treatment. The high binder portions cause a considerable weight loss in the carbonization. The remaining geometric matrix density, therefore, is lower (considerably below 1 g/cm$^3$). Besides there is present a higher carbon portion with lower crystalline arrangement.

According to the later position in the reactor core, it is necessary to accommodate different heavy metal loadings in compacts of the same volume. By heavy metals is meant uranium and thorium. In order to balance the filling of the volume and heavy metal loading one after the other, there must be set up an exactly given amount of material to be pressed as over covering material on the fuel particles. Since the overcoating process does not work without loss, the amount given in advance can only be estimated inexactly and, therefore, requires correction.

The present invention avoids the abovementioned disadvantages and permits the production of fuel compacts for high temperature-fuel elements with uniformly high matrix density, high strength and high heat conductivity in tight packaging, as well as extremely low stresses in narrow packing, and also extremely low requirements for the fuel particles, whereby the fuel and/or fissile particles are overcoated with a molding mixture made of graphite powder and thermoplastic binder resin.

According to the invention, the overcoated particles are provided with hardener and lubricant only on the surface and subsequently compressed in a die heated to a constant temperature of about 150°C., hardened and expelled therefrom as finished compacts. Preferably, hardeners, as for example, hexamethylene tetramine, formaldehyde (or formaldehyde sources such as paraformaldehyde or trioxane) and lubricants for reducing external and internal friction are supplied in a solvent for example water, petrol, benzene, carbon tetrachloride or trichloroethylene which does not dissolve the binder. As lubricants there can be used any conventional mold lubricant, as for example stearic acid, paraffin, long chain alkanols, e.g., octadecanol or fatty oils, e.g., soybean oil.

As the hardenable thermoplastic resin binder there can be used resins such as phenol-aldehyde resins, e.g, phenol-formaldehyde novolaks, cresol-formaldehyde resin, phenol-hexamethylentetramine-resin and furfurylalcohol resin.

It is advantageous to supply the hardener and lubricant directly after the overcoating process in the same apparatus.

It has been found especially good to supply only a part of the required mixture of graphite and binder resin to be pressed as an overcoating to the fuel and/or fertile particles. The remainder necessary to fill the volume is addes as three dimensional pre-compressed granulates of similar granulate size as the overcoated particles. According to the invention these particles are also provided only on the surface with hardener and lubricant. The three-dimensional precompressed granulates when employed can be 5 to 95 % by volume of the total of (1) mixture of graphite and binder present as overcoating on the particles, and (2) the precompressed granulates.

The thermoplastic resin binder is employed in conventional proportions, e.g., 5 to 30 % of the total weight of the thermoplastic resin and the graphite.

The amount of hardener is not critical and it is used in customary amounts of 1 to 15 % of the binder portion of the matrix to convert the thermoplastic resin to a thermosetting resin. The amount of lubricant also is not critical and is employed in an amount sufficient to supply lubricity, e.g., it can be 2 to 20 % of the weight of the binder portion of the graphite matrix.

The hardening which necessarily occurs to some degree in the heating for plasticization and handicaps the compression, according to the process of the invention is according to desire so delayed that the hardener is not homogeneously distributed in the material to be pressed but is only found on the surface of the particles. The thermoplastic phase of the binder despite the relatively high temperature which is held constant is thereby so increased in length of time that it is sufficient for the thorough heating and compression of the compact and this is moldable at lower pressing pressure. The amount of the hardener addition is advantageously so adjusted that the hardening first occurs after the end of the compression and the article to be pressed already shortly after reaching its final dimensions can be expelled again without deformation.

Unless otherwise indicated, all parts and percentages are by weight.

The invention is further explained in the following examples.

EXAMPLE 1

As fuel particles there were employed spherical kernels of $UO_2$ having a grain diameter of 220 $\mu$m. These particles were provided with a three layer coating of a pyrolytically deposited coating, the total thickness of the coating being 180 $\mu$m. An intermediate layer of SiC having a thickness of 23 $\mu$m was present between the two outermost carbon layers. (The thickness of the SiC layer is included in the total thickness of the carbon layers).

The particles having a diameter of 580 $\mu$m and a density of 2.3 g/cm$^3$ contained 21.85 weight % uranium.

The fertile particles of $ThO_2$ having a grain diameter of 617 $\mu$m were provided with a double layer coating of carbon (also pyrolytically deposited) having a total thickness of 144 $\mu$m. The particles having a diameter of 905 $\mu$m and a density of 3.99 g/cm$^3$ contained 63.23 weight % thorium.

As the molding powder there was employed a mixture consisting of 64 weight % natural graphite, 16 % graphitized petroleum coke and 20 % of a thermoplastic phenol-formaldehyde novolak resin as a binder.

The fuel and fertile particles were overcoated in separate processes with the molding powder with addition of methanol in a rotating drum. The amounts supplied were so selected that in the finished compacts there was present a graphite matrix portion of about 55 volume %. There was sprayed on the finished overcoated particles stearic acid as a 5 % solution in trichloroethylene as the lubricant together with 1 % hexamethylenetetramine as the hardener. Based on the binder portion in the matrix powder the hardener addition amounted to 3 weight % and the lubricant addition to 15 weight %. The particles were dried at room temperature.

5.2 grams of overcoated fuel particles and 49 grams of overcoated fertile particles after admixing were filled into a cylindrical compression mold having a diameter of 16 mm and a length of 180 mm and held constant at 150°C. and compressed from both sides. The amounts given correspond at a matrix density of 1.70 g/cm$^3$ to a cylinder length of 100 mm. This length was attained at a compression of less than 20 kp/cm$^2$. After expulsion, the compacts underwent a closed heat treatment at 1800°C. Subsequent electrolytic decomposition of over 100 of the compacts in dilute nitric acid and fluorometric uranium analysis gave values of 7 to 15 micrograms of free uranium and the chemical thorium analysis of 10 to 25 micrograms per compact which is less than half the heavy metal content of one single particle. Thus, it is proven that no particles are destroyed by this process of the invention. The found values only depend on a surface contamination with uranium or thorium.

EXAMPLE 2

Using the process of published German application DAS 2 215 577 as described on column 4, lines 1–34 FIG. 1 and Example 1, there was employed a molding powder of the same composition as for the overcoating and the composition was compressed in cavities of an elastic rubber disc to form three-dimensional isotropic granulates having a 1.5 mm particle size. The entire disclosure of the German application DAS 2 215 577 is hereby incorporated by reference.

A mixture of 10.4 grams of overcoated fuel particles and 24.5 grams of overcoated fertile particles according to Example 1 and 15 grams of the granulates produced in the elastic rubber disc were coated wih hardener and lubricant and compressed in a manner analogous to Example 1. The length referred to (100 mm) at a matrix density of 1.7 g/cm$^3$ was already obtained at about 20 kp/cm$^2$. The uranium analysis carried out analogous to Example 1 showed 15 micrograms of free uranium. Free thorium was ascertained as 20 micrograms, which likewise proves there was a compression free of particle damage.

The composition applied to the overcoat outer surface can consist of or consist essentially of the hardener and lubricant.

What is claimed is:

1. In a process for the production of fuel compacts consisting of an isotropic, radiation resistant graphite matrix of good heat conductivity and having embedded therein coated particles of the group consisting of (1) coated fuel particles, (2) coated fertile particles and (3) a mixture of coated fuel particles and coated fertile particles for insertion in high temperature fuel elements of the coated particles (1), (2) or (3) being overcoated with a molding composition consisting essentially of graphite powder and a binder of a thermoplastic resin capable of being hardened the improvement comprising providing only the outer surface of the overcoat with a hardener for the resin and a lubricant and subsequently compressing in a mold at a constant temperature of about 150°C. and removing the hardened and finished compacts therefrom.

2. The process of claim 1 wherein the thermoplastic resin is a phenol-aldehyde resin.

3. The process of claim 2 wherein the resin is a phenol-formaldehyde novolak.

4. The process of claim 3 wherein the hardener is hexamethylenetetramine.

5. A process according to claim 1 wherein a portion of the particles are replaced by similar granulates three dimensionally precompressed and of about the same particle size as said coated particles (1), (2) or (3), said granulates are also provided only on the outer surface of the overcoat with a hardener for the resin and a lubricant and the mixture of particles and precompressed granulates are compressed at said constant temperature of about 150°C. to harden the resin and form the finished compacts.

6. A process according to claim 1, comprising applying the hardener and lubricant simultaneously to said overcoat surface.

7. A process according to claim 1 comprising adding the hardener and lubricant dissolved in a solvent to the overcoat surface, said solvent being one which does not dissolve the resin binder.

8. A process according to claim 7 wherein the solvent is trichloroethylene.

9. A process according to claim 1 comprising completing the hardening during the molding after the conclusion of the densification.

10. A process according to claim 1 wherein the thermoplastic resin is a phenol-formaldehyde novolak, cresol-formaldehyde resin, furfuryl alcohol resin or phenolhexamethylene tetramine resin.

* * * * *